United States Patent [19]
Greene

[11] Patent Number: 5,838,139
[45] Date of Patent: Nov. 17, 1998

[54] PORTABLE DEVICE BATTERY TECHNIQUE

[75] Inventor: Michael Roy Greene, Long Valley, N.J.

[73] Assignee: Lucent Technologies Inc., Murray Hill, N.J.

[21] Appl. No.: 785,267

[22] Filed: Jan. 17, 1997

[51] Int. Cl.[6] .............................. H02J 7/04; G08B 21/00; G01N 27/415
[52] U.S. Cl. .......................... 320/133; 370/134; 370/136; 340/636; 324/433
[58] Field of Search ..................................... 320/133, 135, 320/136, 134; 340/636; 324/433

[56] References Cited

U.S. PATENT DOCUMENTS

| | | | |
|---|---|---|---|
| 4,030,086 | 6/1977 | Salem ....................................... | 340/636 |
| 4,902,956 | 2/1990 | Sloan ....................................... | 320/135 |
| 5,095,308 | 3/1992 | Hewitt ..................................... | 340/825 |
| 5,140,310 | 8/1992 | DeLuca et al. ........................ | 340/636 |
| 5,424,721 | 6/1995 | Asai ......................................... | 340/636 |
| 5,570,025 | 10/1996 | Lauritsen et al. ...................... | 324/433 |
| 5,600,230 | 2/1997 | Dunstan .................................. | 340/636 |
| 5,652,502 | 7/1997 | Van Phouc et al. ..................... | 320/134 |
| 5,691,742 | 11/1997 | O'Connor ................................ | 345/116 |

FOREIGN PATENT DOCUMENTS

| | | | |
|---|---|---|---|
| 0 714 033 A | 11/1995 | European Pat. Off. ........ | G01R 31/36 |
| 0 714 033 A3 | 11/1995 | European Pat. Off. ........ | G01R 31/36 |

OTHER PUBLICATIONS

European Search Report dated Apr. 21, 1998.

*Primary Examiner*—Peter S. Wong
*Assistant Examiner*—Gregory J. Toatley, Jr.
*Attorney, Agent, or Firm*—Eugene J. Rosenthal

[57] ABSTRACT

When a user has a portable telephone near the absolute end of its available battery power, the user can be caused to behave in a manner that more likely results in the preservation of some battery power for subsequent high priority high priority calls by conveying the illusion that the battery will soon be, or is, depleted even though there actually remains sufficient power in the battery to power the portable telephone for an additional period of time. To this end, at a predetermined time, e.g., two minutes, prior to a projected time at which the battery is expected to have power for only a particular additional amount of time, e.g., eight minutes, the user is signaled with an almost-out-of-power warning. This warning indicates that there remains in the battery enough power to operate the portable telephone only until the projected time, notwithstanding that there actually remains in the battery sufficient power to operate the portable telephone for the additional time beyond the projected time. To enhance the illusion of early battery power depletion, the portable telephone powers off at the projected time. Furthermore, any battery power indicator provides the user with an artificially low power reading that indicates that the battery power will be completely depleted at the projected time. At any point after initiation of the almost-out-of-power warning, the user may take an affirmative action to make available the additional power remaining in the battery. At that point, the display is restored to an accurate indication.

38 Claims, 4 Drawing Sheets

PORTABLE DEVICE BATTERY TECHNIQUE

TECHNICAL FIELD

This invention relates to the providing of battery power for portable devices, and more particularly, to the providing of battery power for portable communication devices.

BACKGROUND OF THE INVENTION

A well known problem in the art of battery powered portable communication devices is how to extend the usable battery life so that power will be available to meet the user's need to communicate when there will, or can, be a long time between recharges of the battery. One solution is to design better batteries to expand the battery capacity. Another approach is to reduce the power consumption requirements of the portable communication device, so that the available battery power is consumed at a slower rate, and thus, effectively, the battery lasts longer.

However, no matter how long the battery life is extended, it is well recognized that users often do not charge their batteries prior to the batteries' substantially complete discharge. In particular, the "present focus" nature of people often causes them to ignore developing situations-even problems-until they are actual problems and it is too late. In addition, the hysteresis effect of certain battery types required users to accustom themselves to insure that all the power stored in their batteries was consumed prior to recharging them, lest the battery capacity be diminished. Thus, users often find themselves in a situation where they have an available portable communication device and are in need of making, receiving, or continuing an important telephone call, but have no available battery power for doing so.

To help users avoid this predicament, typical portable devices, such as mobile telephones, provide the user with a short term, almost-out-of-power warning tone. This warning starts when the user is on a call and battery power for approximately only two minutes worth of operation remains. The tone continues thereafter until there remains no battery power to operate the portable communication device. Upon hearing the warning tone, the user typically completes his call in an orderly, albeit often somewhat hurriedly, fashion prior to the point at which the portable telephone involuntarily powers off for lack of available battery power. Nevertheless, by virtue of having completed the call, the user typically causes consumption of most of what had been the remaining two minutes of battery power. As a result, little or no battery power is left available for subsequent high priority calls that one might need to either originate, such as when one is stuck on the road due to automobile failure, or that one might need to receive, such as an important call from one's boss.

One straightforward method of trying to ameliorate this situation is to begin providing the warning tone somewhat earlier, e.g., when there yet remains ten minutes of battery life. However, because of the extended duration of the warning tone, as well as its somewhat annoying character, the psychology employed by users when the warning tone begins at this earlier, e.g., ten-minute, point in time is somewhat different than when the warning tone begins later, e.g., at the two-minute point as described above. Instead of rushing to complete the current call, when the extended warning tone begins, users are more likely to 1) ignore the warning tone, because it lasts for so long, or 2) not credit the warning tone with a high enough level of priority, because the user is involved in the current call and he perceives that the time remaining until the occurrence of an undesirable consequence-namely having the call involuntarily cut off due to battery depletion—is relatively far off. As a result, the user typically remains on the current call, using up most, or all, of the remaining battery power. Thus, there remains the problem of the user having little, or no, battery power available for a subsequent high priority call.

SUMMARY OF THE INVENTION

I have recognized that when a portable device is near the absolute end of its available battery power, a user can be caused to behave in a manner that more likely results in the preservation of some battery power for subsequent high priority calls. This is achieved, in accordance with the principles of the invention, by conveying to the user the illusion that the battery will soon be, or is, depleted even though there actually remains sufficient power in the battery to power the portable communications device for an additional period of time. Advantageously, the additional battery power is automatically held in reserve, and so it will be available for subsequent high priority calls.

To this end, at a predetermined time, e.g., two minutes, prior to a projected time at which the battery is expected to have power for only a particular additional amount of time, e.g., eight minutes, the user is signaled with a short-term almost-out-of-power warning. This warning indicates that there remains in the battery enough power to operate the portable communications device only until the projected time, notwithstanding that there actually remains in the battery sufficient power to operate the portable communications device for the additional time beyond the projected time, e.g., for the additional eight minutes. To enhance the illusion of early battery power depletion, in accordance with an aspect of the invention, the portable communications device powers off at the projected time, as though it then had no remaining battery power, if the user continues in the conventional manner. Furthermore, optionally, in accordance with an aspect of the invention, prior to the projected time, any battery power indicator that displays remaining battery power provides the user with an artificially low power reading that indicates that the battery power will be completely depleted at the projected time, i.e., at the conclusion of the predetermined period for which the almost-out-of-power warning is supplied. Thus, to the user, the earlier given short-term almost-out-of-power warning appears to be a genuine almost-out-of-power warning just like that provided in the prior art as described above.

However, in accordance with an aspect of the invention, at any point after initiation of the almost-out-of-power warning and prior to initiating the recharging of the battery, or changing it, the user may take an affirmative action, such as pressing a button on the portable communication device, e.g., one marked "reserve power", to make available the additional power remaining in the battery. This is advantageous because, psychologically, the user is less likely to use up his last available battery power if he is forced to take an affirmative action to do so. Once the user takes the affirmative action, in accordance with an aspect of the invention, any battery power indicator which had been displaying an artificially low indication is restored to an accurate indication. Furthermore, in accordance with another aspect of the invention, when it is determined that there remains only enough battery power to power the communications device for the predetermined time, the almost-out-of-power warning is again given to the user.

DETAILED DESCRIPTION

Figure 1:
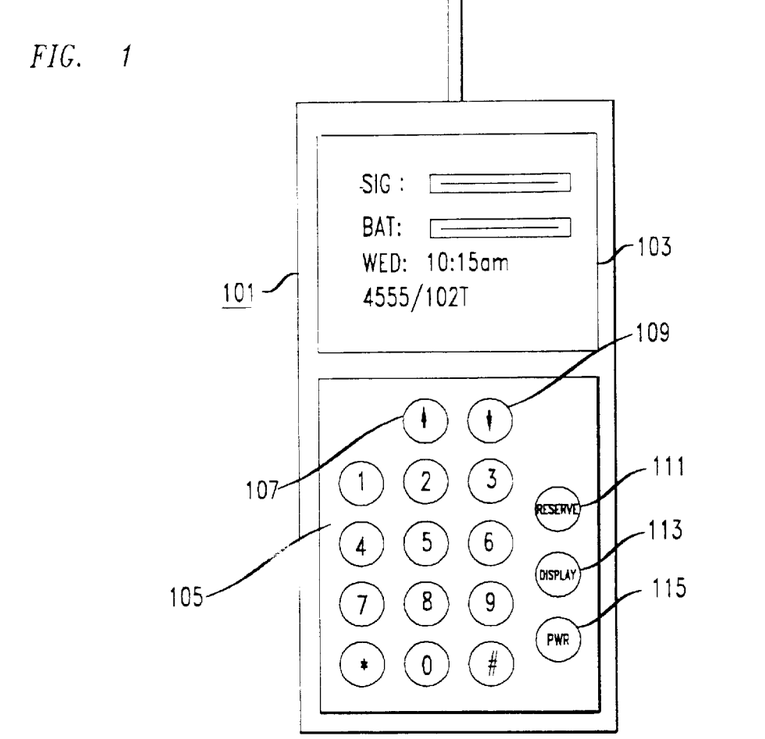
FIG. 1 shows an exemplary mobile telephone embodying the principles of the invention.

FIG. 1 shows an exemplary portable device embodying the principles of the invention. According to these principles 1) a user of the portable device is signaled for a short period prior to a projected time with a short-term almost-out-of-power warning that indicates that there remains in the battery of the portable device enough power to operate the portable device only until the projected time, notwithstanding that there actually remains in the battery sufficient power to operate the portable device for some additional time beyond the projected time, and 2) the portable device is powered off at the projected time unless the user takes affirmative action to invoke the remaining battery power, which is otherwise held in reserve until such action affirmative is taken. More particularly, in FIG. 1, the portable communications device is hand held mobile telephone 101, which includes keypad 105 and display 103.

Mobile telephone 101 may be, for example, a cellular telephone, a personal communication system (PCS) telephone, a conventional portable telephone which is linked to a base unit coupled to a wired line, or d) any similar device. Typically, mobile telephone 101 may be operated in one of two modes. In a conversation mode, mobile telephone 101 is used to establish connections and conduct conversations. In a standby mode, it is powered on but is simply waiting either to receive or initiate a telephone call. Greater power is required to operate mobile telephone 101 in the conversation mode than in the standby mode. Hence the conversation mode causes the battery power to be consumed more quickly than the standby mode.

Keypad 105 includes certain special function keys, such as scroll keys 107 and 109, RESERVE key 111, DISPLAY key 113, and PWR key 115. As those of ordinary skill in the art will recognize, keypad 105 may also include various other miscellaneous keys for such functions as volume control, send, end, etc. However, for clarity and simplification purposes, such keys are not shown in FIG. 1.

Display 103 may be used to display the current status of the battery charge. For example, display 103 can show the amount of remaining standby time, i.e., the time available to operate mobile telephone 101 in the standby mode, and the amount of time available to operate mobile telephone 101 in the conversation mode. As shown in FIG. 1, display 103 is a bar graph type of display. However, other types of displays, e.g. a numeric or alphanumeric display which displays the number of remaining minutes or another code indicative of the remaining time, may be employed. Alternatively, instead of a display, a voice announcement of the same information may be supplied to the user.

Display 103 need not be constantly active, since doing so would result in a faster drain of the battery. Accordingly, display 103 may be controlled so as to actively display information thereon only when, and only so long as, such information is believed to be required by the user. Additionally, DISPLAY key 113 may be used to manually control activation of the display. For example, when battery power information is desired by the user, the display may be activated by pressing DISPLAY key 113 and then using scroll keys 107 and 109 to scroll to the battery-related display.

Figure 2:
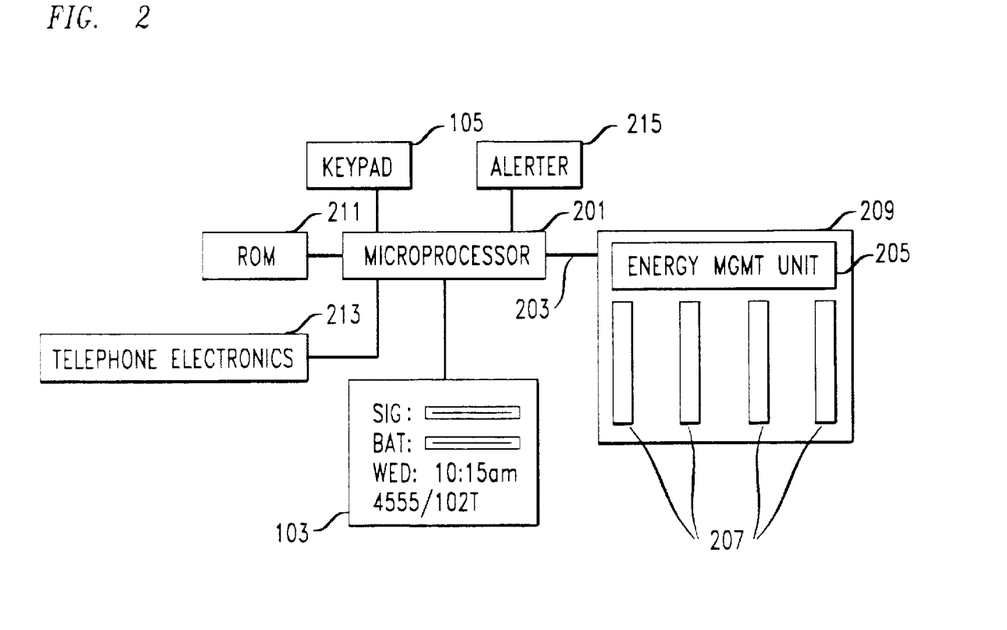
FIG. 2 shows a block diagram illustration of an exemplary circuit for implementing the mobile telephone of FIG. 1.

FIG. 2 shows a block diagram illustration of an exemplary circuit for implementing mobile telephone 101. The circuit includes a) microprocessor 201, b) energy management unit 205, c) battery module 209, d) read only memory (ROM) 211, e) telephone electronics 213, and f) alerter 215. Display 103, telephone electronics 213, and alerter 215 are connected to, and controlled by, microprocessor 201. Keypad 105 is also connected thereto.

Microprocessor 201 may be a microprocessor, microcontroller or any other control type of device. Microprocessor 201 may contain memory, e.g., ROM or random access memory (RAM). For purposes of this example, microprocessor 201 contains RAM which is not shown, but no ROM. Those of ordinary skill in the art will be able to select and arrange combinations of RAM, ROM, and control functionality to meet the needs of any particular application.

Telephone electronics 213 contains all the circuitry necessary to establish and conduct voice-based conversations. Alerter 215 provides alerting information, such as the arrival of a telephone call or the short-term almost-out-of-power warning of the present invention.

Energy management unit 205 can perform various battery functions, such as 1) recharging and 2) monitoring the state of battery cells 207 in battery module 209. Such energy management units are known in the art. Note that as used herein the term "battery" includes all groups of battery cells which are combined to form the operating power source of a portable device such as mobile telephone 101.

Microprocessor 201 is connected to energy management unit 205 by way of bus 203, and over such a connection microprocessor 201 can obtain from energy management unit 205 the amount of remaining charge in battery module 209. The information obtained from energy management unit 205 may be stored within microprocessor 201. The status of battery module 209 obtained from energy management unit 205 may then be used to compute either a remaining standby time or a remaining conversation time, as well as other points in time along the battery power consumption curve, using stored estimates of power consumption when operating in each of the standby or conversation modes, respectively. This computation may be similar to the "miles to empty" computation performed in an automobile where the gas gauge reading is used in conjunction with the average fuel efficiency to determine the number of miles available for driving with the current amount of fuel in the tank.

The calculation of remaining battery time can be estimated dynamically if the rate of power consumption (or current drain with a fixed voltage) is known. The power consumption for the various operating modes of mobile telephone 101 can be measured and stored a priori, so that microprocessor 201 can perform the estimations. For example, there may be stored in ROM 211 the necessary power consumption data for various operating modes, e.g., average power consumption data for the standby and conversation modes.

Alternatively, the actual current drain on the battery in mobile telephone 101 can be determined and then stored in memory in mobile telephone 101. Thus, a "history" of the current drain for each operating mode in mobile telephone 101 can be developed so that microprocessor 201 can utilize this "history" to provide a dynamic estimate of the amount of remaining battery time for both standby and conversation modes.

Figure 3:
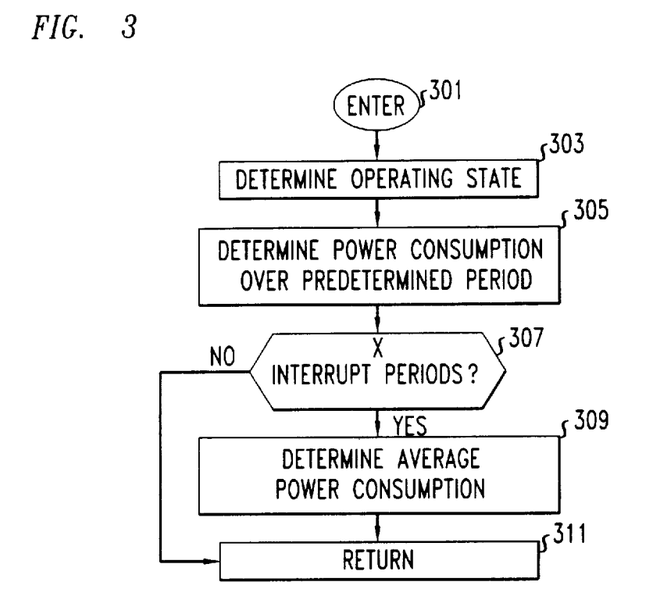
FIG. 3 shows a process for updating the average usage parameters of the mobile telephone of FIG. 1.
Figure 4:
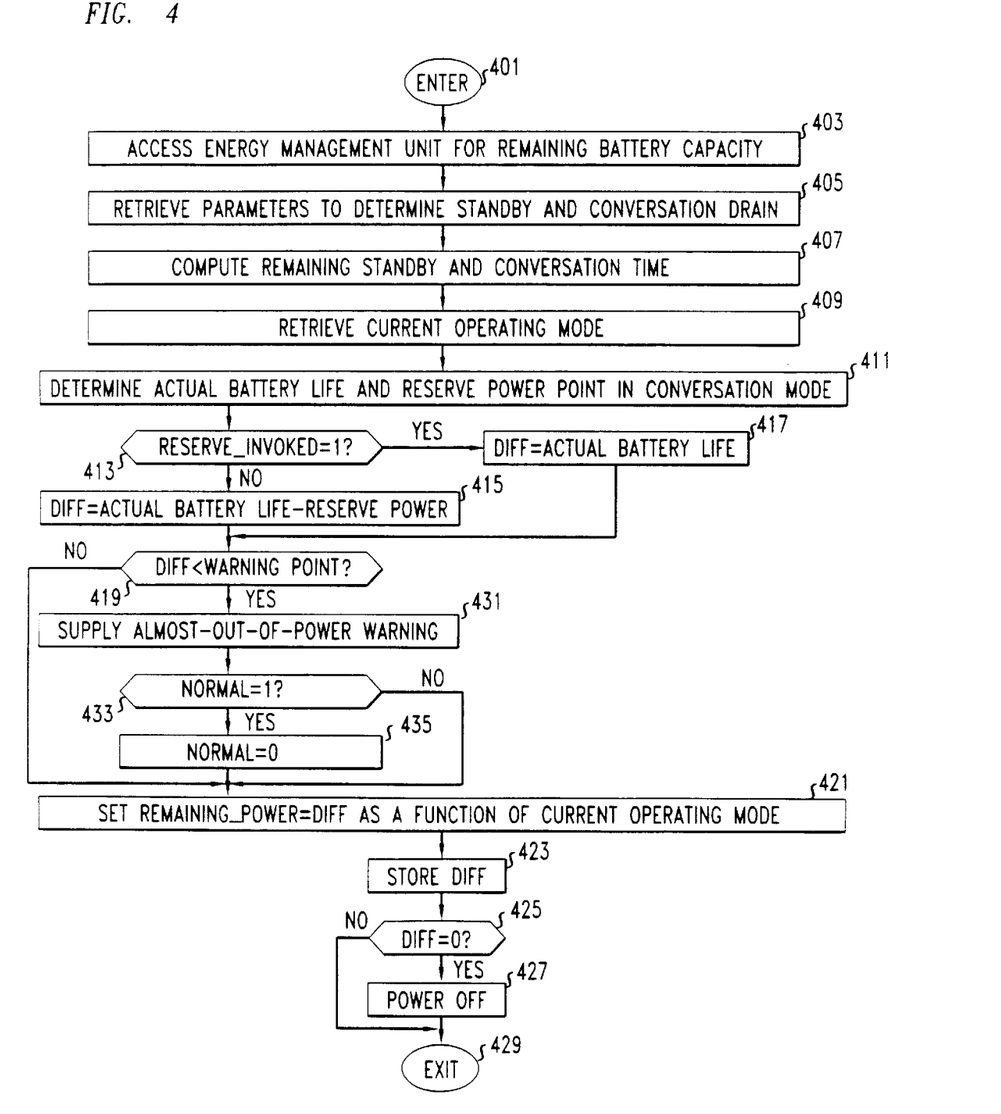
FIG. 4 shows a process for supplying the short-term almost-out-of-power warning, in accordance with the principles of the invention.
Figure 5:
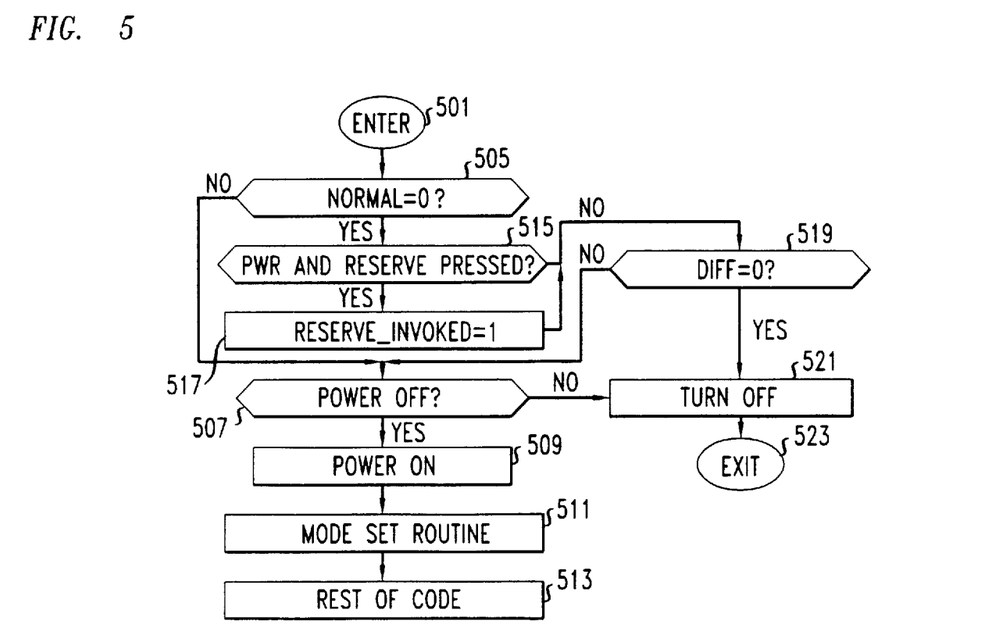
FIG. 5 shows a process, in accordance with the principles of the invention, for determining the appropriate action for mobile telephone of FIG. 1 to take when the PWR button of the mobile telephone of FIG. 1 is pressed.
Figure 6:
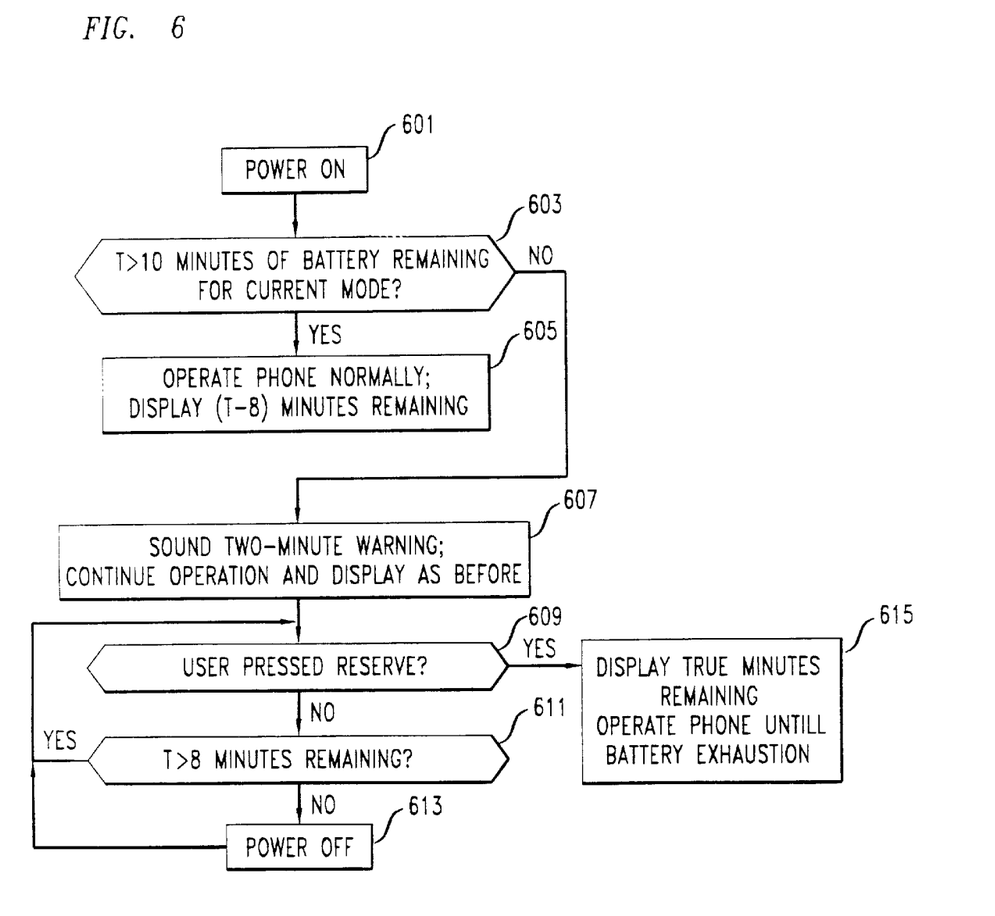
FIG. 6 shows at a high level a particular example of the overall process carried out by the mobile telephone of FIG. 1 in practicing the invention.

FIGS. 3–5 show detailed processes for operating mobile telephone 101 in accordance with the principles of the invention. However, before delving into the details, an operational overview of the behavior of mobile telephone 101 in accordance with the principles of the invention is presented in connection with the flow chart of FIG. 6. In particular, FIG. 6 shows at a high level an example of the overall process carried out by mobile telephone 101 in practicing the invention. In the particular example of FIG. 6, the short-term almost-out-of-power warning is started when there remains Y, e.g., ten, minutes worth of battery power in battery module 209. Unless the user presses RESERVE key 111 within Z, e.g., two, minutes of the beginning of the warning mobile telephone 101 will power off at the end of those two minutes, in accordance with the principles of the invention. Thus, advantageously, eight minutes of battery power are held in reserve.

The process of FIG. 6 is begun in step 601 when mobile telephone 101 is powered on, and then it may be repeated periodically. Next, conditional branch point 603 tests to determine if there remains in battery module 209 enough power to power mobile telephone 101 for more than ten minutes in the current operating mode, e.g., conversation. If the test result in step 603 is YES, control passes to step 605, in which mobile telephone 101 is operated in the conventional manner, except that when battery information is displayed the remaining time is reduced by eight minutes. This is done so that the availability of the eight minutes worth of battery power is not shown to the user.

If the test result in step 603 is NO, control passes to step 607, in which a two-minute warning is sounded. Also, operation of mobile telephone 101 and the display shown thereon are as previously described in step 605. In particular, when battery information is displayed, the remaining time is reduced by eight minutes. Advantageously, doing so psychologically reinforces to the user the genuineness of the two-minute warning, because the user sees on the display that he is nearly out of battery power.

Control then passes to conditional branch point 609, which tests to determine if the user has pressed RESERVE key 111. If the test result in step 609 is NO, control passes to step 611. Conditional branch point 611 tests to determine if there remains in battery module 209 enough power to power mobile telephone 101 for more than eight minutes in the current operating mode. If the test result in step 611 is YES, control passes back to step 609. However, if the test result in step 611 is NO, this indicates that the only power remaining in battery module 209 is the reserve power. Therefore, control passes to step 613, in which, in accordance with an aspect of the invention, mobile telephone 101 powers off. By doing so, the reserve power is preserved for later usage on high priority telephone calls.

If the test result in step 609 is YES, indicating that the user took the affirmative action of pressing RESERVE button 111 to make the reserve power available, control passes to step 615. In step 615 mobile telephone 101 is enabled to operate until battery module 209 can no longer power it in the current operating mode. Also, when battery information is displayed, the true number of minutes remaining is displayed.

Attention is now turned to the detailed exemplary processes for operating mobile telephone 101 that are shown in FIGS. 3–5. In particular, FIG. 3 shows a process for updating the average usage parameters of mobile telephone 101 and for providing an estimate of the amount of current drain that occurs during standby and conversation modes. Such an average may be necessary for various reasons. For example, the power consumption by mobile telephone 101 in each of the operating modes is not the same. Also, the power consumption for identical mobile telephones of the same type as mobile telephone 101 need not be the same. Moreover, in each operating mode mobile telephone 101 must perform various functions that may each require different amounts of power, so that the power consumed during operation in a particular operating mode is not uniform. The process of FIG. 3 is an interrupt routine executed by microprocessor 201 (FIG. 2).

The process is entered in step 301 upon the occurrence of a particular interrupt that is arranged to occur periodically, for example, every 100 milliseconds. Next, in step 303, microprocessor 201 determines the present operating mode i.e., conversation or standby, of mobile telephone 101. Thereafter, in step 305, microprocessor 201 determines the power consumed over the preceding interrupt period of time, e.g., by requesting from energy management unit 205 the amount of charge remaining in battery module 209 and subtracting it from the value which was obtained from energy management unit 205 in the immediately preceding iteration of step 205. The power consumption information determined by microprocessor 201 is stored in memory. The power consumption information is accumulated, in step 307, over a period of time equal to the sum of the lengths of a predetermined number, X, of interrupt periods. X is determined based upon the interrupt interval and the resolution of the power usage that is provided on display 103.

In step 309, microprocessor 201 determines an average power consumption. This may be a composite, i.e., a single current drain figure reflecting both standby and conversation modes, or separate average power consumptions may be determined for each of the conversation and standby modes of mobile telephone 101. In either case, the average is computed by taking the total accumulated power consumption and dividing it by the length of time equal to the sum of the lengths of X interrupt periods. The result is an average power consumption (or current drain) per unit time, which may be normalized to an average power consumption per one minute interval (milliamp/minute). The result may be stored in memory, preferably a non-volatile RAM, for use by the display routine.

The resolution of display 103, in terms of the battery usage information, may be, for example, in units of minutes. Accordingly, with an interrupt interval of 100 milliseconds, microprocessor 201 would set X to a value of 600, so as to accumulate power consumption information over a total of 600 interrupt periods in order to provide the resolution of one minute of displayable battery usage information. When separate sums are kept for each operating mode, the number of interrupt periods that occur for each operating mode are counted separately. As such, X interrupt periods must be accumulated for each operating mode.

On start up, the RAM-based variables are loaded with worst case-figures which were prestored in ROM 211.

Accordingly, when a user of the mobile telephone 101 initially starts up the mobile telephone and requests a display of the battery information, the user will be provided with a worst-case scenario as to the remaining battery capacity. Such worst case figures are also used to initially determine the reserve power point and other time points which are described hereinbelow. Later, upon the acquiring of usage history through the above-discussed routine, the values displayed to the user and the other time points will be updated accordingly.

FIG. 4 shows a process for supplying the short-term almost-out-of-power warning, in accordance with the principles of the invention. The process shown in FIG. 4 may be executed periodically by microprocessor 201, e.g., in response to an interrupt. In step 403, microprocessor 201 accesses energy management unit 205 to obtain the available battery charge. In step 405, microprocessor 201 retrieves the parameters necessary to determine the standby and conversation battery drain. That is, microprocessor 201 will access the average conversation drain and average standby battery drain parameters, such as those described hereinabove, which are stored in memory. Next, in step 407, the remaining standby and conversation times are computed. That is, the available battery current, e.g., milliamps, is divided by the usage rate, e.g., milliamps/minute, to yield the number of minutes available if mobile telephone 101 were to be operated exclusively in its standby mode or exclusively in its conversation mode.

Thereafter, in step 409, the present operating mode of mobile telephone 101 is retrieved by microprocessor 201, which then determines, in step 411, the actual remaining battery life and a reserve power point, in accordance with an aspect of the invention. The reserve power point is the point in time at which the power in the battery will reach the level of power that is desired to keep in reserve, as per the invention. The actual remaining battery life and the reserve power point are computed based on the conversation mode. This is done to insure that when the short-term almost-out-of-power warning is generated there remains reserved battery life that can power mobile telephone 101 in the conversation mode, which draws greater power than the standby mode, and is the mode typically desired by the user. The actual value of the reserve power point is at the discretion of the implementor. It may be useful to set the reserve power point so as to keep reserved enough power to operate mobile telephone 101 in the conversation mode for between 5 and 10 minutes.

In conditional branch point 413, microprocessor 201 tests to determine if the flag RESERVE_INVOKED is equal to "1". If the test result in step 413 is NO, indicating the user has not invoked the reserve power and that mobile telephone 101 is operating without the availability of any power beyond the reserve power point, control passes to step 415, in which a variable DIFF is set equal to the value of the actual remaining battery life in the present operating mode of mobile telephone 101 less the reserve power point as computed for the present operating mode of mobile telephone 101, in accordance with an aspect of the invention. Doing so effectively eliminates the availability of any power less than or equal to the reserve power point. Thereafter, control passes to step 419. If the test result in step 413 is YES, indicating the user has invoked the reserve power and that mobile telephone 101 may continue to operate beyond the reserve power point, even if it has not yet reached that point, control passes to step 417, in which the value of the variable DIFF is set equal to the value of the actual remaining battery life in the present operating mode of mobile telephone 101, in accordance with an aspect of the invention. Thereafter, control passes to step 419.

Conditional branch point 419 tests to determine if the value of DIFF is less than or equal to a threshold value WARNING_POINT, which is the power value at which generation of the short-term almost-out-of-power warning is initiated. It is advantageous to determine the threshold value WARNING_POINT as a function of the present operating mode of mobile telephone 101 for each execution of conditional branch point 419. This is because, by doing so, one can set WARNING_POINT to a value appropriate for the present operating mode of mobile telephone 101, so that the short-term almost-out-of-power warning is given for the same period of time regardless of whether mobile telephone 101 is in the standby mode or in the conversation mode. However, if the user switches from standby mode to conversation mode after initiation of the short-term almost-out-of-power warning, the length of time for which the short-term almost-out-of-power warning is given is likely to be considerably shortened. Those of ordinary skill in the art will be able to determine values for threshold value WARNING_POINT as is appropriate for their particular portable device and applications.

If the test result in step 419 is YES, indicating that the apparent remaining power is less than the amount of power for triggering the supplying of short-term almost-out-of-power warning, and that therefore the warning must be supplied, control passes to step 431 in which the short-term almost-out-of-power warning is supplied, in accordance with an aspect of the invention. Next, conditional branch point 433 tests to determine if the value of the flag NORMAL is equal to "1". When the flag NORMAL is set equal to "1" it indicates that mobile telephone 101 is operating with power greater than or equal to the reserve power point. If the test result in step 433 is YES, indicating that prior to this passage through step 419 mobile telephone 101 was operating with power greater than or equal to the reserve power point, control passes to step 435, which sets the value of NORMAL to "0". Doing so indicates that mobile telephone 101 is now operating with power less than the reserve power point. Control then passes to step 421. If the test result in step 433 is NO, indicating that prior to this passage through step 419 mobile telephone 101 was operating with power less than the reserve power point, control passes directly to step 421.

In step 421, the value of REMAINING_POWER is set equal to the value of DIFF converted to the present operating mode. It is the value of REMAINING_POWER that is displayed when the remaining battery life is displayed on display 103, in accordance with an aspect of the invention. For example, the value of REMAINING POWER is displayed whenever the mobile telephone is powered up or whenever the user presses DISPLAY key 113 (FIG. 1) and uses scroll keys 107 and 109 to scroll to the battery related display. The value of DIFF is then stored in step 423 (FIG. 4).

Thereafter, conditional branch point 425 tests to determine if the value of DIFF is equal to zero. If the test result in step 425 is YES, this indicates either 1) when the reserve power has not yet been invoked, that the actual battery life has reached the reserve power point, and therefore, in accordance with an aspect of the invention, mobile telephone 101 must be powered off; or 2) the actual battery life has reached zero, in which case, also, mobile telephone 101 must be powered off. Therefore, control passes to step 427, in which mobile telephone 101 is powered off, and the process is then exited in step 429. If test result in step 425 is NO, indicating that mobile telephone 101 may continue to be operated, control passes directly to step 429, and the process is exited without powering off mobile telephone 101.

FIG. 5 shows a process, in accordance with the principles of the invention, for determining the appropriate action for mobile telephone 101 to take when the PWR button of mobile telephone 101 is pressed. The process is used to power on or off mobile telephone 101 in response to presses of the PWR button, as well as to set necessary flags for further use by mobile telephone 101. Also, in the event that PWR and the RESERVE buttons are pressed simultaneously, the reserve power is made available so that mobile telephone 101 can be powered beyond the reserve power point.

The process is entered, in step 501, when the PWR button is pressed. Next, conditional branch point 505 tests to determine if the value of the flag NORMAL is equal to "0". When the flag NORMAL is set equal to "1" it indicates that mobile telephone 101 is operating with power greater than or equal to the reserve power point. If the test result in step 505 is NO, indicating that mobile telephone 101 is operating with power greater than or equal to the reserve power point, control passes to conditional branch point 507.

Conditional branch point 507 tests to determine if mobile telephone 101 is currently powered off. If the test result in step 507 is YES, indicating that mobile telephone 101 is currently powered off, control passes to step 509, which powers on mobile telephone 101. Control then passes to step 511, which sets and stores the present operating mode of mobile telephone 101. Control then passes to the rest of the code for operating mobile telephone 101.

If the test result in step 507 is NO, indicating that mobile telephone 101 is currently powered on and operating, control passes to step 521, and mobile telephone 101 is powered off. The process then exits in step 523.

If the test result in step 505 is YES, indicating that mobile telephone 101 is operating with power less than the reserve power point, control passes to conditional branch point 515, which tests to determine if the PWR and the RESERVE buttons were pressed simultaneously. If the test result in step 515 is YES, indicating that the user pressed both the PWR and the RESERVE buttons simultaneously, which is the action necessary to invoke the reserve power and thus make it available, control passes to step 517, in which the value of RESERVE_INVOKED is set equal to "1". Thereafter, or if the test result in step 515 is NO, which indicates that the reserve power was not invoked, control passes to step 519.

Conditional branch point 519 tests to determine if the value of DIFF is equal to zero. If the test result in step 519 is YES, indicating either a) that the battery has reached the reserve power point and the reserve power has not yet been invoked or b) there actually is no remaining battery power, control passes to step 521, and mobile telephone 101 is powered off, in accordance with an aspect of the invention. The process then exits in step 523. If the test result in step 519 is NO, indicating that there remains in the battery power that is currently permitted to be used to power mobile telephone 101, control passes to step 507 and the process continues as described above.

Other conventional methods for determining the battery charge and power usage, as well as the times derived therefrom, may be employed.

The techniques of the invention may be applied to other battery-operated devices which have multiple operating modes, such as lap top computers, e.g., active and sleep, where the user would like to know the amount of remaining operating time. Likewise, it will also readily apparent to those skilled in the art that the invention may be employed with electronic devices that only have a single operating mode.

Note that as used herein, energy, power, current, and charge are all used to represent the ability of a battery to operate a device. The battery is considered depleted when it can no longer operate the portable device in an operating mode desired by the user. Thus, for example, the battery may be considered depleted when it can no longer power a mobile telephone in the conversation mode, notwithstanding that the battery can power the mobile telephone in the standby mode.

If the test result in step 419 is No, indicating that the apparent remaining power is greater than the amount of power for triggering the supplying of short-term almost-out-of-power warning, and that therefore no such warning need be supplied, control passes directly to step 421.

The foregoing merely illustrates the principles of the inventions. It will thus be appreciated that those skilled in the art will be able to devise various arrangements which, although not explicitly described or shown herein, embody the principles of the invention and are included within its spirit and scope.

What is claimed is:

1. A method for use in a portable device powered by a battery, comprising the steps of:
   at a point at which the battery is depleted to a predetermined power level, developing a signal which indicates that the battery will be completely depleted within a predetermined amount of time even though there actually remains sufficient power in the battery to power said portable device for a further period of time in addition to the predetermined amount of time; and
   powering off said portable device upon the passing of the predetermined amount of time unless a user performs a predetermined action prior thereto.

2. The invention as defined in claim 1 wherein said portable device has a battery power indicator, and further comprising the step of adjusting said battery power indicator to indicate that said battery will be completely depleted upon the expiration of the predetermined amount of time.

3. The invention as defined in claim 2 further comprising the step of adjusting said battery power indicator to indicate the true battery power available in response to receipt of a signal indicating that the user performed the predetermined action.

4. The invention as defined in claim 1 wherein said portable device is a communications device.

5. The invention as defined in claim 1 wherein said developed signal is perceptible by the user.

6. The invention as defined in claim 1 wherein said portable device has a battery power indicator, and further comprising the step of continually adjusting said battery power indicator so that at any time prior to executing the powering off step said battery power indicator indicates a false low reading which conveys that the power to power said portable device for a further period of time in addition to the predetermined amount of time does not exist within the battery.

7. The invention as defined in claim 1 further comprising the steps of:
   receiving a signal in response to the user performing the predetermined action prior to expiration of the predetermined amount of time; and
   in response to the received signal, enabling said portable device to remain powered on beyond the expiration of the predetermined amount of time.

8. The invention as defined in claim 1 further comprising the steps of:

receiving a signal in response to the user performing the predetermined action prior to expiration of the predetermined amount of time; and in response to the received signal, enabling said portable device to remain powered on beyond the expiration of the predetermined amount of time until the battery is so depleted that said portable device cannot continue to operate in its then current mode of operation.

9. The invention as defined in claim 1 further comprising the steps of:

receiving a signal that the user performed the predetermined action prior to expiration of the predetermined amount of time;

in response the received signal, enabling said portable device to remain powered on beyond the expiration of the predetermined amount of time; and conveying to a user a signal which indicates that the battery is nearly depleted at a point at which the battery is depleted to said predetermined power level less said power to power said portable device for said further period of time.

10. The invention as defined in claim 1 wherein said portable device is a mobile telephone, and further comprising the steps of:

receiving a signal that the user performed the predetermined action prior to expiration of the predetermined amount of time;

in response to the received signal, enabling said portable device to remain powered on beyond the expiration of the predetermined amount of time; and conveying to a user a signal which indicates that the battery is nearly depleted at a point at which the battery is depleted to said predetermined power level less said power to power said portable device for said further period of time in a conversation mode.

11. The invention as defined in claim 1 wherein said predetermined and further periods of time accrue only while said portable device is powered on.

12. The invention as defined in claim 1 wherein said predetermined action is pressing a button.

13. The invention as defined in claim 1 further including the step of preventing said portable device from powering on after the passing of the predetermined amount of time when the user does not perform the predetermined action prior thereto.

14. The invention as defined in claim 13 wherein said preventing step is completed when the user performs the predetermined action.

15. The invention as defined in claim 14 further including the step of powering on said portable device in response to the user undertaking the predetermined action.

16. A method for use in a portable communication device powered by a battery, comprising the steps of:

when said portable device is on, signaling a user with a short-term almost-out-of-power warning starting a first predetermined period of time prior to a projected time at which the battery is expected to have power for only a particular additional amount of time; and turning off the portable communication device at the projected time as if the portable communication device then had no remaining battery power unless a predetermined indication was received from the user after initiation of said signaling.

17. The invention as defined in claim 16 further including the step of preventing the portable communication device from turning on after execution of said turning off step even though there remains sufficient battery power to do so unless said predetermined indication is received from the user after said projected time.

18. The invention as defined in claim 16 further including the step of receiving said predetermined indication from said user after initiation of said signaling; and enabling further operation of the portable communication device beyond the projected time.

19. The invention as defined in claim 16 further including the steps of receiving said predetermined indication from said user after initiation of said signaling;

enabling further operation of the portable communication device beyond the projected time; and signaling the user with a short-term almost-out-of-power warning starting a second predetermined period of time prior to a projected time at which the battery is expected to be depleted.

20. The invention as defined in claim 19 wherein said first and second periods of time are of the same length.

21. The invention as defined in claim 16 wherein time accrues only while the portable communication device is powered on.

22. A method for use by a portable device powered by a battery, comprising the steps of:

when said portable device is on, signaling a user with a short-term almost-out-of-power warning for a predetermined time immediately prior to a projected time at which the battery is expected to have power for only a particular additional amount of time; and turning off said portable device at the projected time so that it appears as if said portable device has no remaining battery power unless a predetermined indication has been received from the user before the expiration of said predetermined time;

wherein said times are calculated, and said signaling is performed, only relative to periods that said portable device actually is, or has sufficient battery power to be, on.

23. The invention as defined in claim 22 wherein said portable device is a portable communication device.

24. A method for use a portable device powered by a battery, comprising the steps of:

when said portable device is on, signaling a user with a short-term almost-out-of-power warning starting at a predetermined time prior to a projected time at which the battery is expected to have power for only a particular additional amount of time; and turning off the portable device at the projected time as if the portable device then had no remaining battery power unless a predetermined indication was received from the user after said predetermined time.

25. The invention as defined in claim 24 further including the step of preventing the portable device from turning on after execution of said turning off step even though there remains sufficient battery power to do so unless said predetermined indication is received from the user after said projected time.

26. The invention as defined in claim 24 further including the step of receiving said predetermined indication from said user; and enabling operation of the portable device beyond said projected time.

27. The invention as defined in claim 24 further including the step of receiving said predetermined indication from said user;

enabling operation of the portable beyond said projected time; and signaling the user with a short-term almost-out-of-power warning starting at a predetermined time prior to said projected time at which the battery is expected to be depleted.

28. A method for use with a portable device powered by a battery, comprising the steps of:

when said portable device is on, signaling a user with a short-term almost-out-of-power warning starting when said battery is depleted to a first predetermined power level which is greater than a second predetermined power level which is sufficient to operate the portable device for a predetermined reserve amount of time; and turning off the portable device and inhibiting its further operation when the battery is depleted to the second predetermined power level as if the portable device had no remaining battery power for operating the portable device when a predetermined indication is not received from the user between the time that the battery reaches the first predetermined power level and prior to the battery reaching the second predetermined power level.

29. A method for use with a portable device powered by a battery, comprising the steps of:

detecting depletion of the battery to a predetermined first point;

issuing an almost-out-of-power warning;

detecting depletion of the battery to a predetermined second point, said second point being such that there yet remains at least sufficient power in said battery to power said portable device for the difference in time between (i) detection of depletion of the battery to said predetermined first point and (ii) the time difference between detection of depletion of the battery to said predetermined first point and detection of depletion of the battery to said predetermined second point; and operating said portable device in response to detecting depletion of the battery to said predetermined second point so that it appears as if said portable device has no remaining battery power when a predetermined indication has not been received from the user by the expiration of said predetermined time and yet said portable device can receive said predetermined indication.

30. The invention as defined in claim 29 further wherein said portable device is a portable communication device.

31. A method for use with a portable device powered by a battery which has a regular operating mode, comprising the steps of:

detecting depletion of the battery to a predetermined first point;

issuing an almost-out-of-power warning;

detecting depletion of the battery to a predetermined second point, said second point being such that there yet remains at least sufficient power in said battery to power said portable device for the difference in time between (i) detection of depletion of the battery to said predetermined first point and (ii) the time difference between detection of depletion of the battery to said predetermined first point and detection of depletion of the battery to said predetermined second point; and deactivating said portable device in response to detecting depletion of the battery to a predetermined second point, so that it appears as if said portable device has no remaining battery power when a predetermined indication was not received from the user by the expiration of said predetermined time and yet said portable device can receive said predetermined indication.

32. The invention as defined in claim 31 wherein said invention further comprises the steps of:

receiving said predetermined indication; and reactivating said portable device so that it may operate according to said regular operating mode.

33. A method for use by a portable device operated by a battery, said method comprising the steps of:

issuing an almost-out-of-power warning when the battery is depleted to a point at which it is able to power the device for an additional Y minutes;

powering off said device Z minutes later, Z being less than Y, unless a user has provided a predetermined indication within Z minutes after said warning was issued.

34. The invention as defined in claim 33 further comprising the step of normally providing during the operation of said device an indication of the number of minutes of remaining battery operation available which is Y–Z minutes less than the true number, but providing the true number once the user has provided said indication.

35. Apparatus for use in a portable communications device powered by a battery, comprising:

means, responsive to the battery being depleted to a predetermined power level, for developing a signal which indicates that the battery is nearly depleted and will be completely depleted within a predetermined amount of time even though there actually remains sufficient power in the battery to power said portable device for a further period of time in addition to the predetermined amount of time; and means for powering off said portable communications device upon the passing of the predetermined amount of time unless a user performs a predetermined action prior thereto.

36. The invention as defined in claim 35 wherein said predetermined and further periods of time accrue only while said portable device is powered on.

37. Apparatus use in a portable communications device powered by a battery, comprising:

means, operative when said portable device is on, for signaling a user with a short-term almost-out-of-power warning starting when said battery is depleted to a first predetermined power level which is greater than a second predetermined power level which is sufficient to continuously operate the portable communications device for a predetermined reserve amount of time; and means for turning off the portable communication device and inhibiting its further operation when the battery is depleted to the second predetermined power level as if the portable communication device had no remaining battery power for operating the portable communications device when a predetermined indication is not received from the user between the time that the battery reaches the first predetermined power level and prior to the battery reaching the second predetermined power level.

38. A portable device powered by a battery, comprising:

means for signaling a user with a short-term almost-out-of-power warning when said portable device is on, said short-term almost-out-of-power warning being started at a predetermined time prior to a projected time at which the battery is expected to have power for only a particular additional amount of time; and means for turning off the portable communication device at the projected time as if the portable device then had no remaining battery power unless a predetermined indication is received from the user after said predetermined time.

* * * * *